United States Patent [19]
Beug et al.

[11] 3,819,271
[45] June 25, 1974

[54] METHOD AND APPARATUS FOR MEASURING AGGLUTINATION OF CELLS IN A CARRIER LIQUID

[75] Inventors: Hartmut Beug, Tubingen-Buhl; Günther Gerisch, Tubingen, both of Germany

[73] Assignee: Max-Planck Gesellschaft Zur Forderung der Wissenschaften e.V., Gottingen, Germany

[22] Filed: Nov. 13, 1972

[21] Appl. No.: 305,941

[30] Foreign Application Priority Data
Nov. 15, 1971 Germany.......................... 21566552

[52] U.S. Cl..................... 356/39, 356/197, 356/246
[51] Int. Cl...................... G01n 33/16, G01n 21/24
[58] Field of Search........ 356/39, 197, 246; 350/95; 233/26

[56] References Cited
UNITED STATES PATENTS
3,391,597  7/1968  Gropper.............................. 233/26
3,552,865  1/1971  Leung et al......................... 356/246
3,617,222  11/1971  Matte.................................. 356/39
3,713,775  1/1973  Schmitz.............................. 356/197

*Primary Examiner*—Ronald L. Wibert
*Assistant Examiner*—V. P. McGraw
*Attorney, Agent, or Firm*—Hans Berman; Kurt Kelman

[57] ABSTRACT

The agglutination of cells in carrier liquids is measured by enclosing the cell-carrying liquids in cuvettes having two opposite sides of flat glass and moving the cuvettes in a circular path while they are set into circumferential notches of a wheel rotated at uniform velocity. The cuvettes pass between a light source and a photoelectric cell equipped with slotted aperture plates in such a manner that the output of the photoelectric cell is a measure of the light scattered by the contents of each cuvette, and therefore of the number of cell aggregates in the carrier liquid. The light measurements may be made while the wheel rotates or after the wheel is stopped.

10 Claims, 3 Drawing Figures

METHOD AND APPARATUS FOR MEASURING AGGLUTINATION OF CELLS IN A CARRIER LIQUID

This invention relates to the measurement of cell agglutination in a carrier liquid, and particularly to a method of measuring agglutination for serological, hematological, and similar biological tests, and to apparatus for performing the measurements.

It is common practice to measure cell agglutination in routine tests by a dilution method, specimens being diluted sequentially with equal amounts of clear carrier liquid until a standard specimen matches the turbidity of the last diluted specimen. The method is relatively costly in terms of technician's time, has an inherent margin of error of 50 percent, and relies on human judgment.

The present invention aims at providing an agglutination test which can be performed automatically or semi-automatically, and whose results are independent of human judgment and have a narrower margin of error than the afore-described dilution method.

According to one aspect of this invention, a carrier liquid having cells suspended therein is enclosed in a container which is moved in a circular path at a uniform velocity, whereby the cells are subjected to a constant shear force opposing their agglomeration. A beam of light thereafter is passed through the suspension and the amount of light scattered by passage through the suspension is determined as a measure of the agglutination of the cells.

Preferred apparatus for measuring the agglutination of cells suspended in a liquid carrier comprises a cuvette holder having an axis of rotation and formed with recesses angularly distributed along a circle about the axis and open in a radially outward direction. A drive motor rotates the cuvette holder about its axis at a uniform speed. Cuvettes are respectively received in the recesses of the holder, and each cuvette has two axially opposite transparent walls which permit passage of a light beam through the cuvette cavity in an axial direction. Measuring equipment for measuring the scattering of the light beam by the contents of each cuvette cavity includes a light source arranged on one side of the afore-mentioned circle, and a photoelectric cell which responds to the energy of the light beam passed through each cuvette and received by the photoelectric cell for generating an electric signal. Aperture plates having aligned narrow slots and arranged on opposite sides of the cuvette exclude scattered light from reaching the photoelectric cell.

Other features, additional objects, and many of the attendant advantages of this invention will readily be appreciated as the same becomes better understood by reference to the following detailed description of a preferred embodiment when considered in connection with the appended drawing in which.

Figure 1:
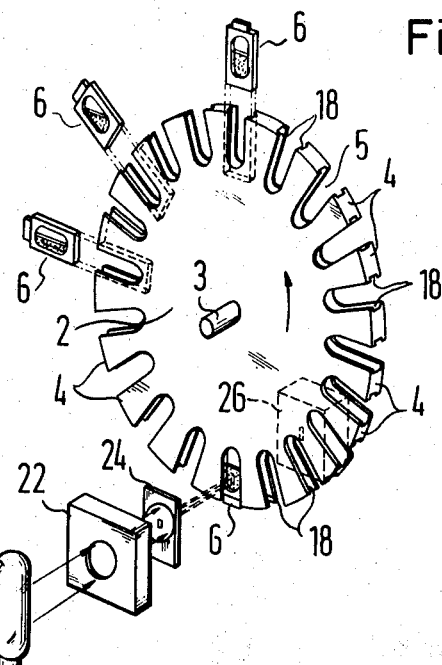
FIG. 1 shows apparatus of the invention in a fragmentary perspective view.

Referring now to the drawing in detail, and initially to FIG. 1, there is shown only as much of apparatus of the invention as is needed for an understanding of the novel features. The cuvette holder 2 is a wheel mounted on the horizontal output shaft 3 of a motor-driven, variable-speed transmission, not otherwise shown. The circumference of the wheel carries twenty equiangularly spaced teeth 4. The teeth define therebetween twenty notches 5 open in a radially outward direction and shaped for conformingly receiving identical cuvettes 6.

Figure 2:
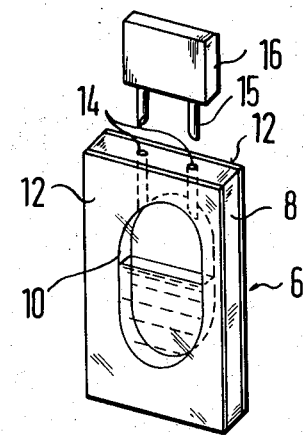
FIG. 2 is a perspective view of one of the cuvettes in the apparatus of FIG. 1 on a larger scale.

As is better seen in FIG. 2, each cuvette 6 consists of a rectangular, stainless steel plate 8 whose major faces are parallel. An opening 10 of uniform cross section extends through the plate 8 between the parallel faces and constitutes an elongated cavity in the cuvette transversely closed by two optically flat glass plates 12 cemented to the parallel faces of the plate 8. The stainless steel plate 8 has two parallel, planar wall portions in the cavity 10 and two hemicylindrical transverse wall portions which connect the longitudinal walls.

Two bores 14 in the plate 8 are parallel to the direction of elongation of the plates 8, 12 and of the cavity 10. Their inner orifices communicate with the cavity 10, and their outer orifices communicate with the atmosphere in the condition of the cuvette illustrated in FIG. 2. Under normal operating conditions, pins 15 on a plug 16 are inserted in the bores 14 so as completely to occupy the same from the inner to the outer orifices, the ends of the pins 15 being obliquely inclined to the direction of pin elongation so as to be flush with the semicylindrical wall of the sealed cavity 10 at the orifice of each bore 14. When not obstructed by the pins 15, the bores 14 provide conduits for filling, emptying, and rinsing the cavity 10.

The flanks of the teeth 4 which circumferentially bound the notches 5 are provided with radial grooves 18 whose width is only slightly greater than the combined thickness of the plates 8, 12, and a leak spring (not shown) is located in each groove 18 and bent in a shallow arc to resist spontaneous release of an inserted cuvette 6. The glass plates 12 are directed in opposite axial direction in the inserted cuvettes.

In an actual embodiment of the invention, the plates 8, 12 were 25 mm long and 14.5 mm wide. The cavity 10 was 2 mm thick, 18 mm long overall, and 10 mm wide. The bores 14 had a diameter of 1.5 mm.

Figure 3:
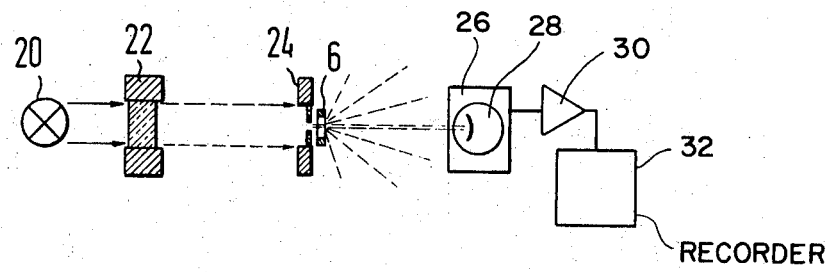
FIG. 3 shows the photoelectric measuring device in the apparatus of FIG. 1 in partly diagrammatic plan view.

During rotation of the wheel 2, the cuvettes 6 pass sequentially between a mercury vapor lamp 20 and photoelectric apparatus, as is only partly shown in FIG. 1 and better understood from joint consideration of FIGS. 1 and 3. A filter 22 is permeable only to light of the lamp 20 having a wavelength of 400 to 600 nm. An aperture plate 24 is located about 65 mm from the filter 22 and has an upright slot about 1 mm wide and 4 mm long located very close (about 3 mm) to a cuvette passing between aperture plate 24 and the front wall of a housing 26 located about 50 mm behind the cuvette 6 and itself formed with an upright slot approximately 0.8 mm wide and 8 mm high. The housing encloses a multiplier phototube 28. The output of the phototube 28 is fed to an amplifier 30 which operates a recorder 32.

As is indicated in FIG. 3 by broken lines, much of the light beam of the lamp 20 which reaches the cuvette 6 is scattered by the suspended cells and cell aggregates in the cuvette 6, and the light reaching the tube 28 is limited essentially to the portion of the beam which passes straight through the cuvette 6.

The wheel 2 and cuvettes 6 are drawn substantially to scale in FIG. 1. The centers of the cuvettes 6 thus move along an upright circle of approximately 15 cm diameter. They were filled with enough cell suspension to occupy slightly more than one half of the cavity volume, as is shown in FIG. 2, approximately 0.2 ml being required for this purpose. Under these conditions and with an aqueous carrier liquid, good results were consistently achieved with a wheel speed of 40 r.p.m., but the multiple speed transmission represented in FIG. 1 only by its output shaft 3 permits both higher and lower, uniform speeds to be achieved if desired.

With a recorder capable of registering 800 readings per minute, the wheel 2 need not be stopped for recording the amount of light not scattered by the contents of each cuvette 6. With less rapidly operating recording equipment, the electric drive of the wheel 3 may be stopped after a suitable period, for example 10 minutes or any other period after which no further significant changes in light readings are observed, and the wheel can be turned manually in steps of 18° for obtaining sequential readings from the twenty cuvettes. An experienced technician can obtain 20 readings on a recorder within about 30 seconds. Inching drives for indexing the wheel 2 are available, however, and such a drive may be set for turning the wheel 2 through sequential steps of 18°, and limit switches may be arranged in an obvious manner for activating the recorder 32 between successive steps.

It has been proposed heretofore to employ the optical properties of cell suspensions for measuring the aggregation of cells, for example, by Born (Nature 194 [1962]927) and Cunningham et al. (Experientia 23 [1967]). The known devices measure total light absorption, and their results are not readily duplicated with great precision because of the mode of operation and the shear stresses applied to the suspended cells in a manner not conducive to reproducibility. These methods also do not lend themselves to simultaneous examination of multiple samples in the manner inherent in the circumferentially notched wheel 2.

The shape and arrangement of the cuvettes 6 causes all walls of the cavity 10 to be wetted by the liquid in the cuvette during each revolution of the wheel 2. It is virtually impossible for cell aggregates to attach themselves to the cuvette walls. Optical precision is assured in a simple manner by the passage of light through the cuvette at right angles through the ground and polished glass plates 12.

All measurements referred to in the afore-cited papers by Born and Cunningham et al are capable of being performed in an obvious manner in the apparatus illustrated and described, though the calibration and calculation of individual results will require obvious modifications in a manner familiar to those skilled in the art.

It should be understood, of course, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. A method of measuring the agglutination of suspended cells in a carrier liquid which comprises:

a. enclosing a suspension of said cells in said liquid in a container having a volume greater than the volume of said suspension;
b. moving said container during a predetermined period in a circular upright path at a uniform velocity, whereby said cells are subjected to constant shear forces;
c. thereafter passing a beam of light through said suspension; and
d. determining the amount of light scattered by passage through said suspension as a measure of the agglutination of said cells.

2. A method as set forth in claim 1, wherein said velocity is sufficient to cause all walls of said cavity to be wetted by said liquid during each movement of said container through said path.

3. A method as set forth in claim 1, wherein said beam of light is passed through said suspension during said moving of said container.

4. A method as set forth in claim 1, wherein said container is stopped after repeatedly moving through said path, and said beam of light is passed through the suspension in the stopped container.

5. Apparatus for measuring the agglutination of cells suspended in a liquid carrier which comprises:

a. a cuvette holder having a horizontally extending axis of rotation and formed with a plurality of recesses angularly distributed along a circle about said axis and open in a radially outward direction;

b. drive means for rotating said cuvette holder about said axis at a uniform speed;
c. a plurality of cuvettes respectively secured in said recesses, each cuvette defining a cavity therein and having two axially opposite, transparent walls for passage of a light beam through said cuvette in an axial direction; and
d. measuring means for measuring the scattering of said light beam by the contents of the cavity of each cuvette, said measuring means including a light source arranged on one side of said circle, and photoelectric means responsive to the energy of the beam passed from said source through each cell and received by said photoelectric means for generating an electric signal.

6. Apparatus as set forth in claim 5, wherein each cuvette includes a frame member having two opposite faces and formed with an opening therethrough between said faces, two plate members of transparent material sealed to said faces respectively and closing said opening, said opening constituting said cavity, said frame member being formed with a conduit communicating with said cavity and having an outer orifice, and plug means releasably sealing said orifice.

7. Apparatus as set forth in claim 5, wherein said faces are parallel, and said opening is of elongated shape in a plane parallel to said faces, said frame member having two longitudinal wall portions and two transverse wall portions bounding said opening, said longitudinal wall portions being planar and parallel to each other, and said transverse wall portions being arcuate and connecting said longitudinal wall portions.

8. Apparatus as set forth in claim 7, wherein said transverse wall portions are substantially semi-cylindrical about respective axes of curvature transverse to said plane, said conduit having an inner orifice in one of said transverse walls.

9. Apparatus as set forth in claim 5, wherein said measuring means further include two aperture plates formed with respective slots elongated in a common direction transverse to said beam, said slots being aligned in the direction of said beam, one of said aperture plates being interposed between said source and said cuvette, and the other aperture plate being interposed between said cuvette and said photoelectric means.

10. A method as set forth in claim 2, wherein said speed is sufficient to cause all walls of each cavity to be wetted by a liquid occupying approximately one half of the volume of said cavity.

* * * * *